March 3, 1936.  F. R. WEST  2,032,384
RESEATING AND RETHREADING TOOL
Filed March 5, 1935
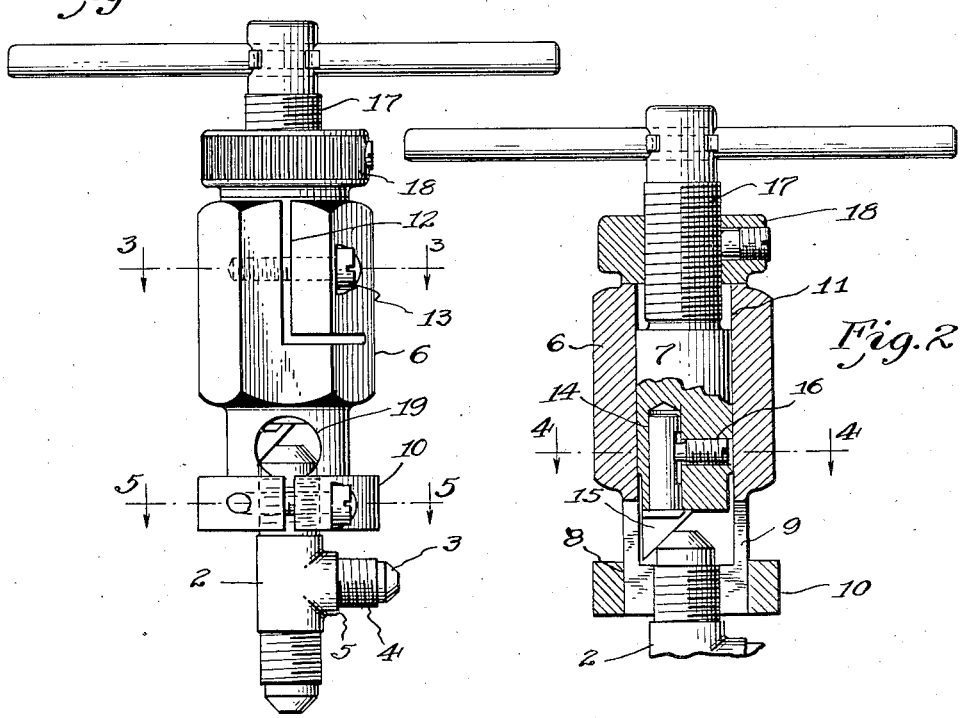
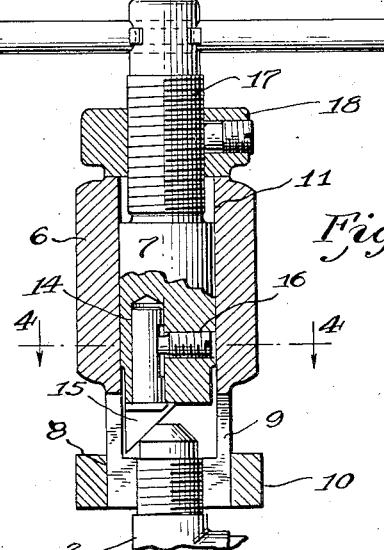
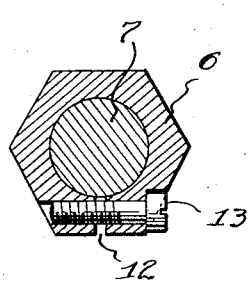
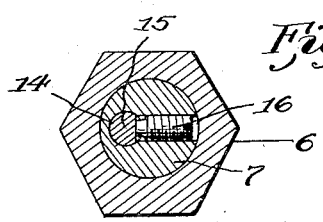
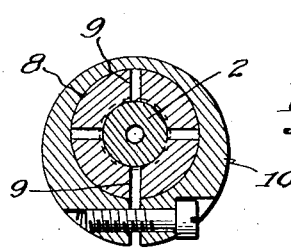
INVENTOR.
Frank R. West
BY
ATTORNEYS Patented Mar. 3, 1936

2,032,384

UNITED STATES PATENT OFFICE 2,032,384

RESEATING AND RETHREADING TOOL

Frank R. West, Detroit, Mich.

Application March 5, 1935, Serial No. 9,453

12 Claims. (Cl. 10—109)

This invention relates to a reseating and rethreading tool, and has to do particularly with an accurate and compact tool for reconditioning the threads and/or marred ends of male fittings. Heretofore, tools for reseating the ends of metal tubes such as used in refrigeration, oil burner, and automotive industries have usually depended upon a sleeve or collet to guide the cutting tools, such sleeve or collet being screwed down to the end of the thread and up against the shoulder of the fitting. As certain surfaces of the shoulder, particularly when used, are almost invariably out of alignment with the axis of the thread, this usually results in a wobbly or wavy flare which is out of alignment with the axis of the threads. This is also particularly true of those types of refacing tools having a short guiding sleeve and a short thread making it practically impossible to truly reface the seat with the threads.

It is an object of the present invention to provide a reseating tool which is so arranged and so cooperates with the threads of the fitting that the plane of the reseating surface is exactly at right angles to the axis of the thread. More specifically, this is accomplished by means of an extra long slotted threaded member which is hardened; an adjustable clamping ring is slipped over the end of the slotted member whereby the threaded member is clamped solidly into place against the thread of the fitting and not against the shoulder. The threaded member being hardened, it can be used as a thread chaser to clean up and even to recut damaged threads.

Another feature includes a single cutter and an adjustable split bearing for obtaining a snug fit between the cutter member and the housing so as to prevent chattering.

Still other features include a stop collar to prevent the cutting away of too much metal in the reseating operation, a peep-hole for observing the reseating operation, and details of structure as will be more clearly set forth in the specification and claims.

In the drawing:

Fig. 1 is an elevation of my reseating and threading tool clamped in reseating position on a fitting.

Fig. 2 is a longitudinal sectional view showing particularly how the collet is clamped in position short of the shoulder and showing the stop collar in final position after the reseating operation.

Fig. 3 is a sectional view taken on line 3—3 of Fig. 1.

Fig. 4 is a sectional view taken on line 4—4 of Fig. 2 illustrating the method of holding the cutter in position.

Fig. 5 is a sectional view taken on line 5—5 of Fig. 1 illustrating the manner of clamping the split collet in position on the threads of the fitting.

The present tool is adapted to recondition fittings of the type as shown at 2 in Fig. 1. The important surface of such a fitting is the seating surface 3 for receiving the tube fitting; this surface 3 is usually formed at a 45° angle to the axis of the threads 4. Due to necessary methods in manufacture or subsequent damage, a shoulder 5 is more often than not out of alignment with the axis of the threads 4, with the result that ordinary reseating tools which are tightly clamped against the shoulder are consequently out of alignment with the true axis of the threads.

The preferred embodiment of the invention as shown in the drawing comprises a reseating tool having a main housing 6 which acts as a bearing for the cutter unit 7. The inner end of the housing 6 terminates in a collet 8. This collet is threaded and hardened and is also slotted as best shown at 9 in Fig. 5. The cutting unit 7 will always remain the same and each reseating tool consists of a set of outer housings 6 as the collet member 8 will vary according to the size of the thread of the fitting which is to be reseated and/or rethreaded.

A clamping ring 10 is adapted to be clamped around the collet 8 and inasmuch as this collet member is slotted and hardened it can be used as a thread chaser and can be used to clean up and even recut damaged threads. After the clamped collet has cleaned or chased the thread all the way home to the shoulder 5, it is slightly backed away as shown in Fig. 2, and the adjustable ring 10 securely clamped into place upon the clean threads. Inasmuch as the inner bearing surface 11 of the housing 6 is orginally formed in positive alignment with the axis of the threads of the collet 8, it will be seen that if the collet is securely clamped on these threads alone, not against the shoulder 5, the bearing surface 11 will be in direct axial alignment with the axis of the thread of the collect 8 and hence of the threads 4 of the fitting being reconditioned.

The shank 7 of the cutter tool unit is adapted to have a close fit within the bearing 11 of the housing 6 and in order to insure an accurate snug bearing surface one wall of the housing 6 is slotted as at 12, adjustment being obtained by means of screw 13 threaded into one wall of the slot. The inner end of the shank 7 is drilled as at 14 to receive a single cutter member 15, such cutter being held in place by means of a set screw 16. The outer end of the shank 7 of the cutting tool is threaded as at 17 for receiving a stop collar 18.

In operation, after the hardened and threaded collet has been used to clean up or recut the thread or damaged thread and has been backed away from the shoulder, the same is clamped tightly in position by the clamping ring 10. The shank 7 carrying the cutter 15 may then be moved into position within the bearing 11 until the cutter member just contacts with the end of the fitting to be reconditioned; this operation can be observed by looking through the peep-hole 19. The stop collar 18 can then be set so as to be spaced a slight distance above the housing 6, the slotted part of the bearing adjusted so as to have a snug fit around the shank 7, and the cutter then turned to reface the end of the fitting down to a point controlled by the stop collar 18. The snug fit between the shank 7 and the bearing 11 will prevent chattering and the fact that the entire tool unit is supported by the thread alone will insure that the surface being refaced will be absolutely true with respect to the axis of the thread.

What I claim is:

1. A reseating tool for cylindrical threaded members comprising a housing for carrying and guiding a cutting tool adapted to reface the end of said member, an inwardly yieldable threaded collet of a size adapted to fit the threads on said member, and means for clamping said collet in position solely on said threads whereby said housing and cutting tool are maintained in alignment with the axis of the threads.

2. A reseating tool for cylindircal threaded members comprising a housing for carrying and guiding a cutting tool adapted to reface the end of said members, a slotted threaded collet of a size adapted to fit the threads on said member, and means for clamping said collet in position solely on said threads whereby said housing and cutting tool are maintained in alignment with the axis of the threads.

3. A combined reseating and rethreading tool for cylindrical threaded members comprising a housing for carrying and guiding a cutting tool adapted to reface the end of said member, a hardened inwardly yieldable threaded collet of a size adapted to fit the threads on said member, and means for clamping said collet in position solely on said threads whereby said housing and cutting tool are maintained in alignment with the axis of the threads.

4. A combined reseating and rethreading tool for cylindrical threaded members comprising a housing for carrying and guiding a cutting tool adapted to reface the end of said member, a hardened slotted threaded collet of a size adapted to fit the threads on said member, and means for clamping said collet in position solely on said threads whereby said housing and cutting tool are maintained in alignment with the axis of the threads.

5. A reconditioning tool for cylindrical threaded members comprising a housing carrying and guiding a reseating tool, and means for clamping said housing to the threaded members to be reconditioned, a portion of said housing being slotted and threaded to act as a rethreading tool upon the thread of the member being reconditioned.

6. A reconditioning tool for cylindrical threaded members comprising a reconditioning tool unit, a bearing housing therefor, a slotted threaded portion on the housing adapted to fit the thread of the cylindrical member, and means for clamping the threaded portion of the housing on the threads of the cylindrical member, a portion of said bearing housing being adjustable about the tool whereby to maintain a snug fit between the housing and the tool unit to maintain alignment between the tool unit and the threads of the cylindrical member.

7. A reconditioning tool for cylindrical threaded members comprising a reconditioning tool unit, a bearing housing therefor, a slotted threaded portion on the housing adapted to fit the thread of the cylindrical member, means for clamping the threaded portion of the housing on the threads of the cylindrical member, a portion of said bearing housing being adjustable about the tool whereby to maintain a snug fit between the housing and the tool unit to maintain alignment between the tool unit and the threads of the cylindrical member, and a stop collar secured to the tool unit and adapted to contact with the housing for limiting the extent of the reconditioning operation.

8. A reseating tool for cylindrical threaded members comprising a reseating tool unit, a bearing housing therefor, a slotted threaded portion on the housing adapted to fit the thread of the cylindrical member, means for clamping the threaded portion of the housing on the threads of the cylindrical member, a portion of said bearing housing being adjustable about the tool whereby to maintain a snug fit between the housing and the tool unit to maintain alignment between the tool unit and the threads of the cylindrical member, and stop means for limiting the amount of the reseating operation.

9. A reconditioning tool for cylindrical threaded members comprising a housing carrying and guiding a reseating tool, means for clamping said housing to the threaded members to be reconditioned, a portion of said housing being slotted and threaded to act as a rethreading tool upon the thread of the member being reconditioned, and a peep-hole formed in said housing to make the reconditioning operation visible to the operator.

10. A reconditioning tool for cylindrical threaded members comprising a reconditioning tool unit, a bearing housing therefor, a slotted threaded portion on the housing adapted to fit the thread of the cylindrical member, means for clamping the threaded portion of the housing on the threads of the cylindrical member, a portion of said bearing housing being adjustable about the tool whereby to maintain a snug fit between the housing and the tool unit to maintain alignment between the tool unit and the threads of the cylindrical member, and a peep-hole formed in said housing to make the reconditioning operation visible to the operator.

11. A reconditioning tool for cylindrical threaded members comprising a reconditioning tool unit, a bearing housing therefor, a slotted threaded portion on the housing adapted to fit the thread of the cylindrical member, means for clamping the threaded portion of the housing on the threads of the cylindrical member, a portion of said bearing housing being adjustable about the tool whereby to maintain a snug fit between the housing and the tool unit to maintain alignment between the tool unit and the threads of the cylindrical member, a stop collar secured to the tool unit and adapted to contact with the housing for limiting the extent of the reconditioning operation, and a peep-hole formed in said housing to make the reconditioning operation visible to the operator.

12. A reseating tool for cylindrical threaded members comprising a reseating tool unit, a bearing housing therefor, a slotted threaded portion on the housing adapted to fit the thread of the cylindrical member, means for clamping the threaded portion of the housing on the threads of the cylindrical member, a portion of said bearing housing being adjustable about the tool whereby to maintain a snug fit between the housing and the tool unit to maintain alignment between the tool unit and the threads of the cylindrical member, stop means for limiting the amount of the reseating operation, and a peep-hole formed in said housing to make the reseating operation visible to the operator.

FRANK R. WEST.